US012614910B2

(12) United States Patent
Rouse et al.

(10) Patent No.: US 12,614,910 B2
(45) Date of Patent: Apr. 28, 2026

(54) DRILLING RIG POWER SUPPLY BUS MANAGEMENT

(71) Applicant: Rouse Industires Inc., Weyburn (CA)

(72) Inventors: Codie Rouse, Weyburn (CA); William John Rouse, Weyburn (CA)

(73) Assignee: ROUSE INDUSTRIES INC., Weyburn (CA)

( * ) Notice: Subject to any disclaimer, the term of this patent is extended or adjusted under 35 U.S.C. 154(b) by 34 days.

(21) Appl. No.: 17/884,459

(22) Filed: Aug. 9, 2022

(65) Prior Publication Data

US 2023/0223781 A1      Jul. 13, 2023

Related U.S. Application Data

(62) Division of application No. 16/616,862, filed as application No. PCT/CA2018/050601 on May 23, 2018, now Pat. No. 11,408,255.

(30) Foreign Application Priority Data

May 23, 2017     (CA) ................................ CA 2967921

(51) Int. Cl.
*H02J 7/14*          (2006.01)
*E21B 4/04*          (2006.01)
(Continued)

(52) U.S. Cl.
CPC .................. *H02J 7/14* (2013.01); *E21B 4/04* (2013.01); *E21B 15/045* (2013.01); *E21B 41/0085* (2013.01); *H02J 3/32* (2013.01)

(58) Field of Classification Search
CPC ...... H02J 7/14; H02J 3/32; E21B 4/04; E21B 15/045; E21B 41/0085; E21B 41/00;
(Continued)

(56) References Cited

U.S. PATENT DOCUMENTS 8,446,037 B2 * 5/2013 Williams .............. H02J 7/0068
                                                                        307/18
9,065,300 B2 * 6/2015 Williams ................ F02D 19/10
(Continued)

FOREIGN PATENT DOCUMENTS

CA          2607466 A1     4/2009
CN          2546617 Y      4/2003
(Continued)

OTHER PUBLICATIONS

International Search Report from corresponding Patent Application No. PCT/CA2018/050601 dated Jul. 17, 2018.

*Primary Examiner* — Cathleen R Hutchins
(74) *Attorney, Agent, or Firm* — Christensen, Fonder, Dardi, Busse; Andrew H. Auderieth; Doug Christensen

(57) ABSTRACT

A power system and method for the adaptive power control of a drilling rig. While operating the internal combustion engine in its efficient operating range, unrequired mechanical power is converted to electrical power for storage, or use via the electrical bus on the rig. When the internal combustion engine is not required to provide mechanical or electrical power it is deactivated, and then reactivated—electrical storage on the system in the meantime providing electrical power to the bus as required. The power supply and management system could be retroactively fitted to an existing drilling rig by the incorporation of a generator and electrical storage device thereon. The system and method of the present invention allow for the optimized use of combustion-based power on a drilling rig while minimizing environmental emissions from the idle running of the at least one internal combustion engine.

2 Claims, 5 Drawing Sheets

(51) Int. Cl.
     *E21B 15/04*         (2006.01)
     *E21B 41/00*         (2006.01)
     *H02J 3/32*          (2006.01)

(58) Field of Classification Search
     CPC .......... F02B 63/04; F02B 63/06; F02D 29/04;
                 F02D 29/06; F04B 15/02; F04B 17/03;
                                  F04B 17/05
     See application file for complete search history.

(56)           References Cited

U.S. PATENT DOCUMENTS

| | | | |
|---|---|---|---|
| 9,381,990 B2 * | 7/2016 | Settemsdal | ............... B60L 7/16 |
| 9,856,719 B1 * | 1/2018 | Williams | .................. H02J 3/32 |
| 10,017,993 B2 | 7/2018 | Hu et al. | |
| 11,008,834 B2 * | 5/2021 | Priser | ................. E21B 41/0085 |
| 11,697,986 B2 * | 7/2023 | Zheng | .............. H02J 13/00002 |
| | | | 307/19 |

| | | | |
|---|---|---|---|
| 2009/0312885 A1 | 12/2009 | Buiel | |
| 2010/0068071 A1 | 3/2010 | Bowden | |
| 2011/0074165 A1 | 3/2011 | Grimes et al. | |
| 2013/0271083 A1 | 10/2013 | Williams | |
| 2020/0169088 A1 * | 5/2020 | Myers | ....................... H02J 7/34 |

FOREIGN PATENT DOCUMENTS

| | | | |
|---|---|---|---|
| CN | 101675206 A | 3/2010 |
| CN | 201705323 U | 1/2011 |
| CN | 102947114 B | 2/2013 |
| CN | 203386028 U | 1/2014 |
| CN | 204458030 U | 7/2015 |
| CN | 105804675 B | 7/2016 |
| CN | 103758503 B | 8/2016 |
| CN | 106104953 A | 11/2016 |
| JP | 2001-304001 A | 10/2001 |
| JP | 2008-231762 A | 10/2008 |
| WO | 2009-070876 A1 | 11/2009 |
| WO | 2015-011223 A2 | 1/2015 |

* cited by examiner

Section A-A

P1

DRILLING RIG POWER SUPPLY BUS MANAGEMENT

This application is a Divisional of application Ser. No. 16/616,862, filed Nov. 25, 2019, which is a National Stage filing of PCT Application No.: PCT/CA2018/050601, filed May 23, 2018, which claims priority to Canadian Application No.: CA2967921, filed May 23, 2017, all of which are incorporated herein by reference.

FIELD OF THE INVENTION

The present invention relates to power supply systems for drilling rigs, and more particularly to a rig mud pump drive and a power management system and method associated therewith.

BACKGROUND OF THE INVENTION

System inefficiencies in the power supply of a drilling rig, for example, for use in oil and gas exploration, result in increased fuel consumption and therefore increased emissions output, either due to power losses in the electrical power distribution of sizeable electrical power over a considerable distance of the rig or due to use of oversized and underutilized mechanical drive systems—in particular the mud pump drive system—that are designed for peak power requirements but are utilized most of the time substantially below peak power, yet have to be in a state of readiness (running) at all times for good control.

Internal Combustion Engine (ICE) systems in compliance with new environmental regulations require higher levels of maintenance load and heat to ensure proper operation of after-treatment systems employed to reduce emissions. Failure to provide adequate load and or temperature will result in a deteriorated after-treatment system no longer capable of meeting the new environmental regulations, thus requiring, for example, a 'Force Regen' process in which the ICE system raises its speed and creates artificial load in order to develop high levels of heat in order to clean the after-treatment system by burning the contamination therein.

While fully electric powered rigs using batteries charged by generator sets and power management systems address some of the problems arising from peak or cyclical loads, they have inherent efficiency losses due to the electrical power distribution such as, for example, losses from the generator creating the power, transmission losses between the generator and the battery or load sensing system and between the battery or load sensing system and the drives, and losses in the electric drives. Consequently, there have been developments where the draw-works (hoisting and rotary functions) are electrically driven, while the mud pump(s)—having the most significant power consumption—are mechanically actuated to take advantage of the efficiencies of the mechanical power train.

Unfortunately, the ICE system driving the mud pump(s) are still underutilized for most of their operating time resulting in the aforementioned problems. It is desirable to provide a rig mud pump drive that enables operation of an ICE driving the mud pump within its efficient operating range.

It is also desirable to provide a power management system and method associated with the mud pump drive that enables operation of an ICE driving the mud pump within its efficient operating range.

It is also desirable to provide a power management system and method associated with the mud pump drive that keeps the mud pump drive in a state of readiness while the ICE driving the mud pump is shut off.

SUMMARY OF THE INVENTION

Accordingly, one object of the present invention is to provide a rig mud pump drive that enables operation of an ICE driving the mud pump within its efficient operating range.

Another object of the present invention is to provide a power management system and method associated with the mud pump drive that enables operation of an ICE driving the mud pump within its efficient operating range.

Another object of the present invention is to provide a power management system and method associated with the mud pump drive that keeps the mud pump drive in a state of readiness while the ICE driving the mud pump is shut off.

According to one aspect of the present invention, there is provided with a rig mud pump drive. The rig mud pump drive comprises an input power drive shaft adapted for being connected to an internal combustion engine for receiving mechanical input power therefrom. An output power drive shaft is adapted for being connected to the rig mud pump for providing mechanical output power thereto. A mechanical drive train is interposed between the input power drive shaft and the output power drive shaft and mechanically connected thereto. One or more electric generators/motors is mechanically connected to the mechanical drive train. The electric generators or motors can be located anywhere in the mechanical drive train in relation to other components therein, so long as the necessary rotary power for mechanical power of the generator can be provided—as such the generator could be connected right in proximity to the internal combustion engine, or elsewhere along the drive shaft etc. All such approaches are contemplated within the scope of the present invention, either in newly built or retrofitted rigs.

According to the aspect of the present invention, there is provided with a power management system. The power management system comprises a processor and a control communications network connected to the processor. The control communications network includes a mud pump drive control node connected to an internal combustion engine for driving a mud pump of the rig, an electric motor or generator interposed between the internal combustion engine and the mud pump, and an electric power storage device. A draw-works control node is connected to the electric power storage device and draw-works of the rig. A generator set control node is connected to the electric power storage device, an electric generator set of the rig, and main rig power. The processor controls operation of the internal combustion engine, the electric generator set and the electric motor or generator in dependence upon power consumption of the mud pump, the draw-works, and the main rig power such that the internal combustion engine for driving the mud pump is operated within its efficient operating range.

According to the aspect of the present invention, there is provided with a method for managing power supply of a drilling rig. A processor is connected via a control communications network to an internal combustion engine for driving a mud pump of the rig, an electric motor or generator interposed between the internal combustion engine and the mud pump, an electric power storage device, draw-works of the rig, an electric generator set of the rig, and main rig power. Operation of the internal combustion engine, the electric generator set and the electric motor or generator is controlled in dependence upon power consumption of the mud pump, the draw-works, and the main rig power such that the internal combustion engine for driving the mud pump is operated within its efficient operating range.

The advantage of the present invention is that it provides a rig mud pump drive that enables operation of an ICE driving the mud pump within its efficient operating range.

A further advantage of the present invention is that it provides a power management system and method associated with the mud pump drive that enables operation of an ICE driving the mud pump within its efficient operating range.

A further advantage of the present invention is to provide a power management system and method associated with the mud pump drive that keeps the mud pump drive in a state of readiness while the ICE driving the mud pump is shut off.

The adaptive power management method of the present invention could be implemented in a pre-existing rig or rig drivetrain, by merely installing a single generator into an existing drivetrain of a rig and executing the remainder of the control system and methodology outlined herein. Provision of a retrofit ability for the use of pre-existing rigs and rig drivetrains is explicitly contemplated within the scope of the present invention—any method which would allow for the adaptable control of internal combustion power and related other components and the electrical power bus on a rig, as outlined in further detail elsewhere herein, is contemplated within the scope of the present invention.

BRIEF DESCRIPTION OF THE DRAWINGS

A preferred embodiment of the present invention is described below with reference to the accompanying drawings, in which.

DESCRIPTION OF THE PREFERRED EMBODIMENT

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

Figure 1A:
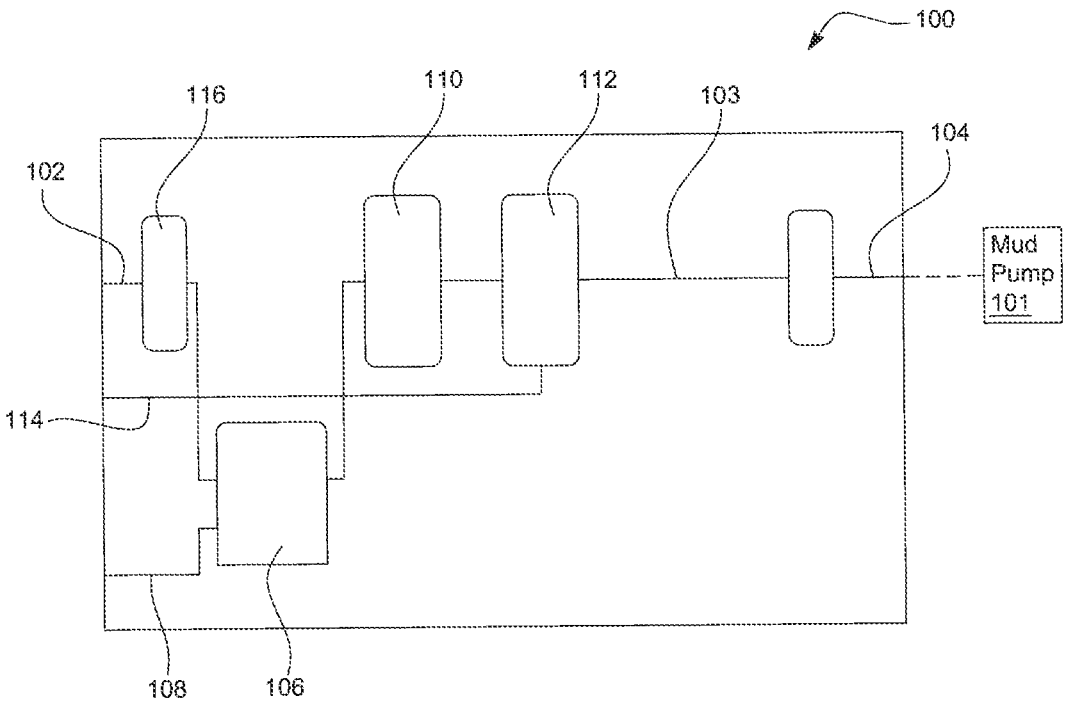
FIG. 1a is a simplified block diagram illustrating a drilling rig mud pump drive according to a preferred embodiment of the invention.
Figure 1B:
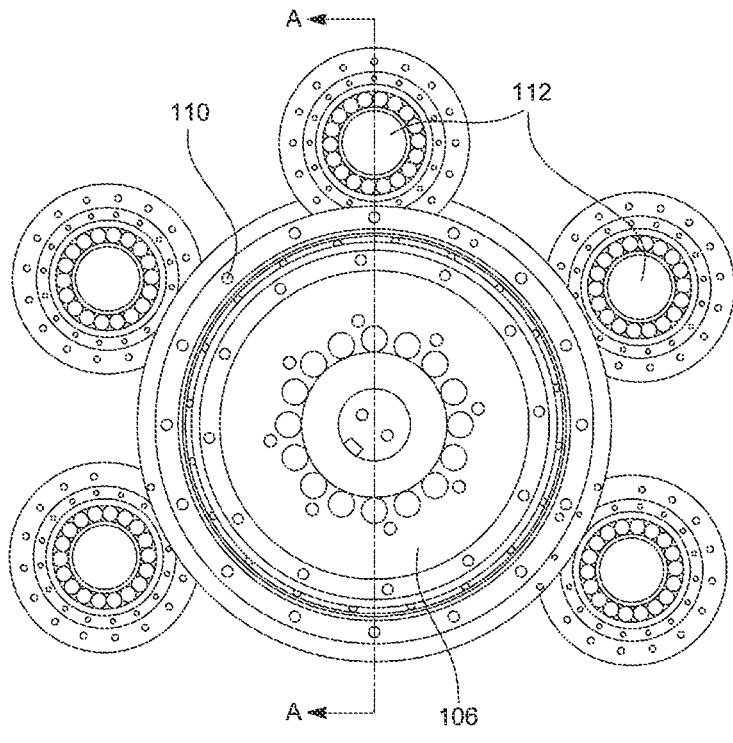
FIGS. 1b and 1c are simplified block diagrams illustrating in a front view and a cross-sectional view, respectively, an electric generator with modulating electric motor or generators of the rig mud pump drive according to the preferred embodiment of the invention.
Figure 1C:
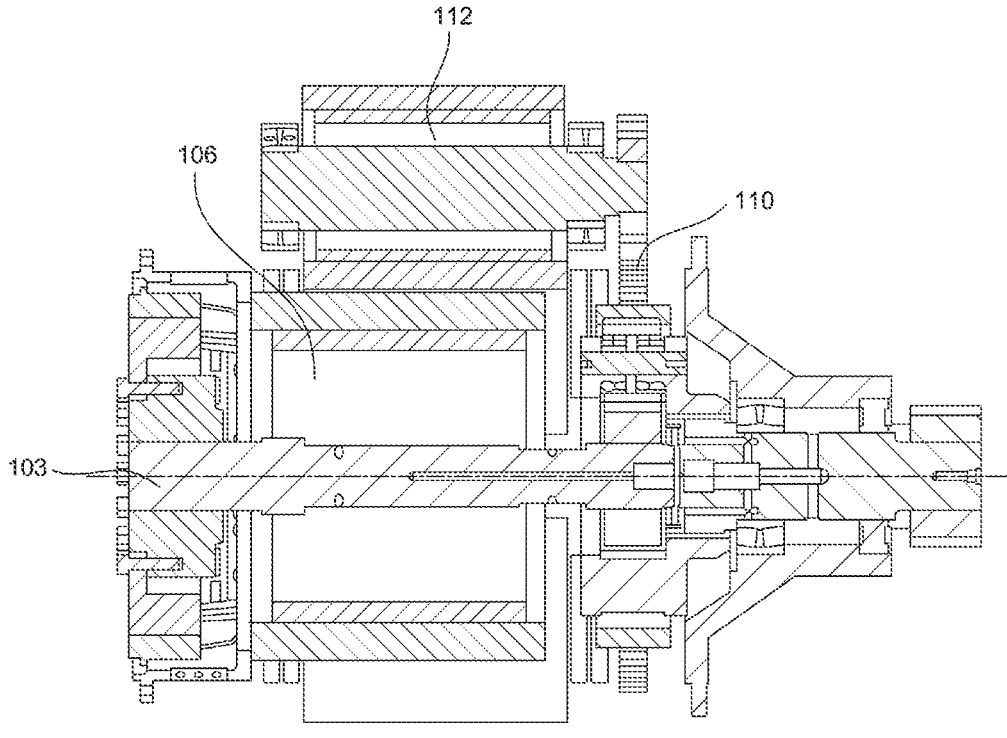

Referring to FIGS. 1a to 1c, a rig mud pump drive 100 according to a preferred embodiment of the invention is provided. Input power drive shaft 102 connected to an ICE such as, for example, a high-powered diesel engine (not shown) for receiving mechanical input power therefrom. Output power drive shaft 104 is connected via, for example, a shave and belt drive to a rig mud pump 101 for providing mechanical output power thereto. The input power drive shaft 102 and the output power drive shaft 104 is connected via a mechanical drive train 103. Any number of different types of connections or transmission arrangements can be understood by those skilled in the art for the link of the generator 106 to the drivetrain 103—this could include a transmission, gearbox, clutch, belt drive or any number of other types of connections or transmission arrangements which will be understood to those skilled in the art and are all contemplated within the scope of the present invention.

The number of modulating electric motor or generators 112 is not limited to 5 as illustrated, but may be varied between 1 and any number with a more substantial number of modulating electric motor or generators 112 providing more flexibility in operating the rig mud pump drive 100 at the expense of higher complexity and cost. The modulating electric motor or generators 112 are of conventional technology. For example, regular AC asynchronous electric motors can usually be employed as electric generators without any internal modifications. The electric generator 106 and the modulating electric motor or generators 112 are electrically connected to the electrical power system of the rig via electric connections 108 and 114, respectively.

The rig mud pump drive 100 also comprises a mechanism 116 for separating the ICE from the drive train 110. For example, the rig mud pump drive 100 for driving a mud pump 101 using an ICE comprises an electric generator 106 and five modulating electric motor or generators 112 as shown. Preferably, the modulating electric motor or generators 112 are designed to provide sufficient mechanical power for driving the mud pump 101 in order to keep the rig mud pump drive 100 in a state of readiness while the ICE driving the mud pump 101 is shut off.

Figure 2:
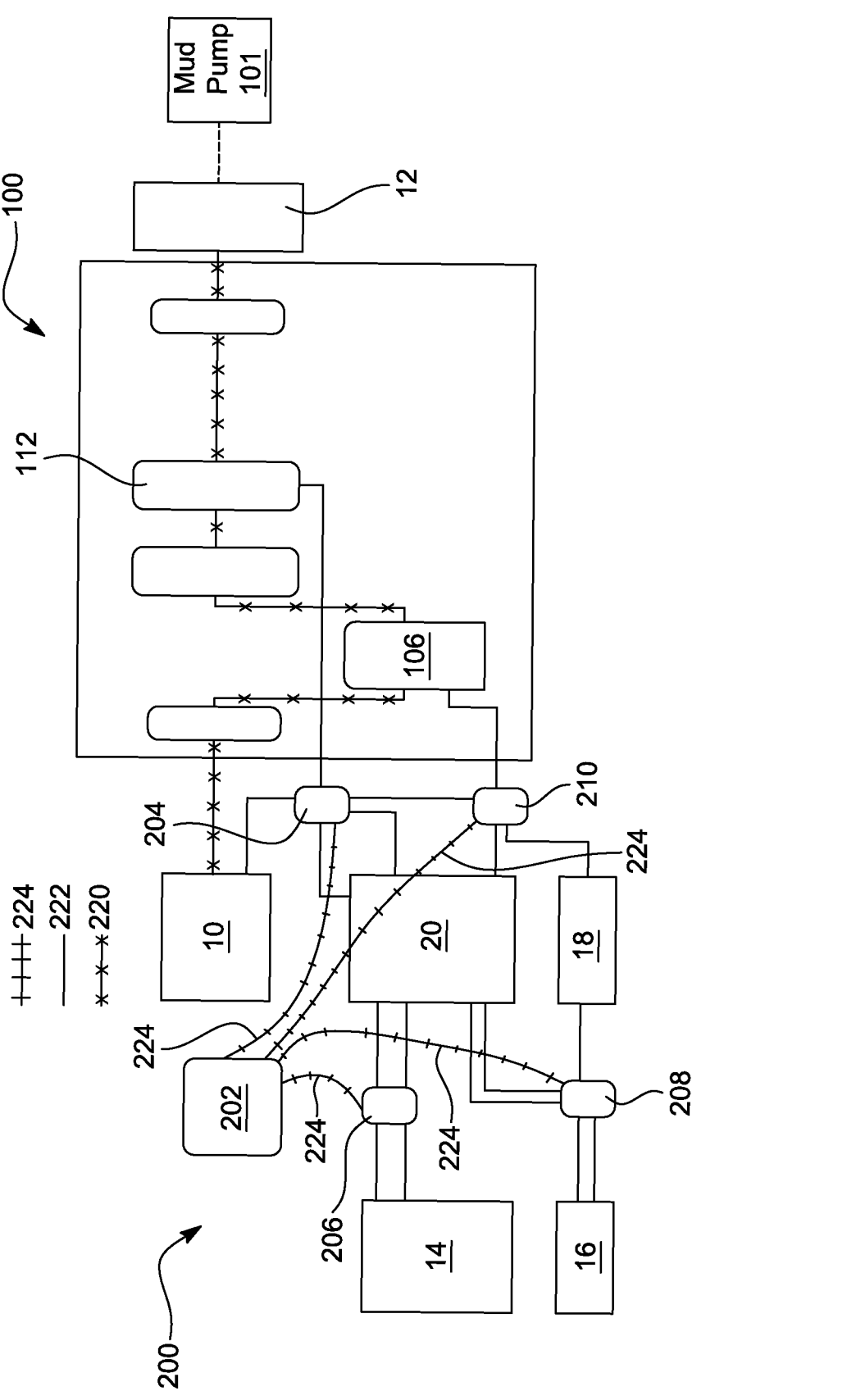
FIG. 2 is a simplified block diagram illustrating a power management system according to a preferred embodiment of the invention.

Referring to FIG. 2, a power management system 200 according to a preferred embodiment of the invention is provided. The mud pump 101 is mechanically 220 driven by ICE 10 via sheave 12 connected to the mud pump drive 100. The power management system 200 comprises a processor 202 such as, for example, a conventional off-the-shelf Field-Programmable Gate Array (FPGA), connected to a control communications network 224, 226. For example, the processor 202 and the control communications network 224, 226 are implemented as a conventional Controller Area Network (CAN) bus with the processor 202 forming 'Master Control' communicating with, for example, control nodes 204, 206, 208, and 210.

Mud pump drive control node 204 is connected to ICE 10 for driving a mud pump 101 of the drilling rig via shave 12; modulating electric motor or generators 112; an electric power storage device 20 of the rig. Generator control node 18 is connected to the electric generator 106, the electric power storage device 20; rig power bus 18 (the rig power bus 18 being any electric power consumption of the rig other than draw-works 14 and the modulating electric motor or generators 112 connected to the electric supply network of the rig); and the mud pump drive control node 204. Draw-works control node 206 is connected to the electric power storage device 20; and draw-works 14 of the rig. Generator set control node 208 is connected to the electric power storage device 20; electric generator set 16 of the rig, and the rig power bus 18.

Electric power transmission lines 222 connect the electric generator 106 and the modulating electric motor or generators 112 via control nodes 204 and 210 to the electric power storage device 20 and the rig power bus 18, as well as the draw-works 14 and the electric generator set 16 via control nodes 206 and 208 to the electric power storage device 20 and the rig power bus 18. The electric power is converted where necessary from AC to DC, for example, for battery or load sensing system storage, using conventional rectifiers and from DC to AC using conventional inverters.

The processor 202 controls operation of the ICE 10, the electric generator set 16, the electric generator 106, and the modulating electric motor or generators 112 in dependence upon the power consumption of the mud pump (sheave 12), the draw-works 14, and the rig power bus 18 such that the ICE 10 is operated within its efficient operating range.

Figure 3:
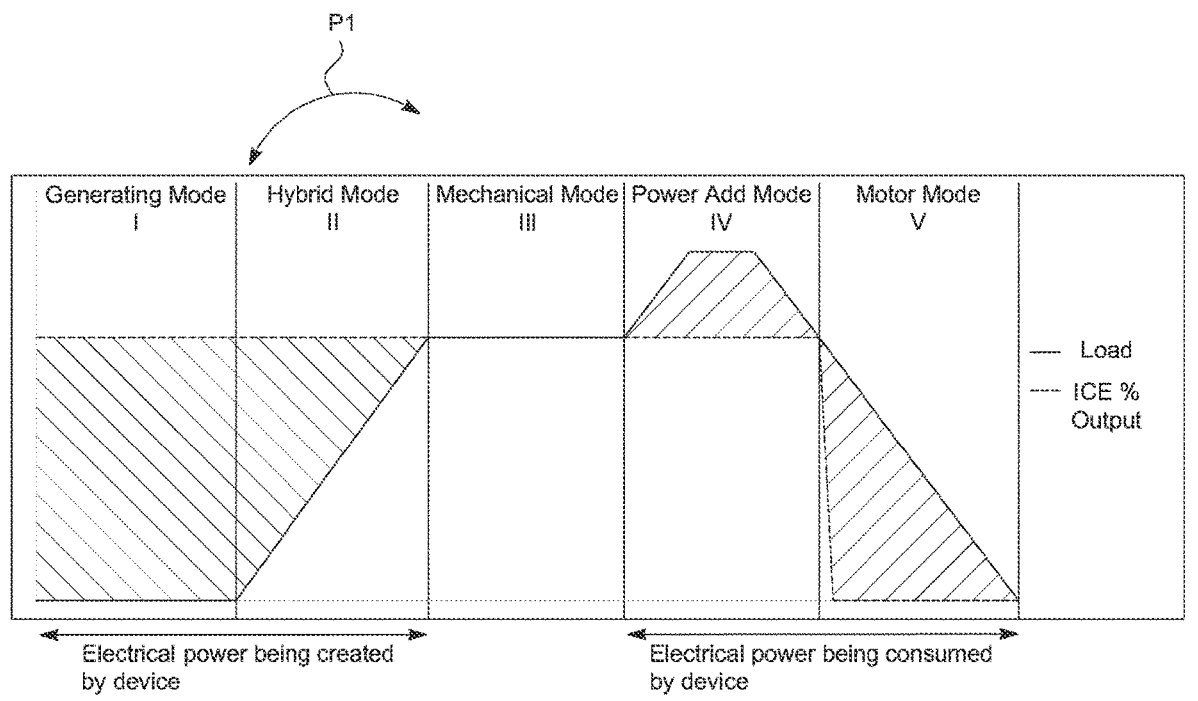
FIG. 3 is a simplified block diagram illustrating five different modes of power provided to the mud pump using the power management system according to the preferred embodiment of the invention.

FIG. 3 illustrates five modes of operation of the power management system 200. In mode, I, the electric generator 106, and the modulating electric motor or generators 112 produce electric power 234 for storage or use when there is no mechanical power requirement from the pump. In mode II, the electric generator 106, and the modulating electric motor or generators 112 produce electric power 234 for storage in the electric power storage device 20 or use in other loads on site when the mechanical power consumption 232 of the mud pump is less than the power 230 produced by the ICE 10 when operated in its efficient range P1. In mode III, the system uses the ICE to produce only mechanical power to the pump, and the electric generator and modulating motor are used just for speed variation. In mode IV, the modulating electric motor or generators 112 produce mechanical power 236 to assist the ICE when the mechanical power consumption 232 of the mud pump (for example, peak power) is higher than the energy 230 produced by the ICE 10 when operated in its efficient range P1. In mode V, the modulating electric motor or generators 112 produce mechanical power 238 for driving the mud pump while the ICE 10 is shut off.

The five modes of operation of the power management system 200 provide substantial efficiency increase and emissions reduction by:

Mode I: operating the ICE 10 in its efficient range and providing electric power to the electric supply network of the rig (which also substantially prevents the use of 'Force Regen' processes) and reduces the need for running additionally dedicated Genset engines onsite;

Mode II: operating the ICE 10 in its efficient range and providing excess as electric power to the electric supply network of the rig (which also substantially prevents the use of 'Force Regen' processes) and reduces the need for running additionally dedicated Genset engines onsite;

Mode III: enabling maximum power transfer efficiency by utilizing mechanic power transfer from ICE to Pump directly;

Mode IV: enabling employment of a smaller ICE 10 than needed to provide peak power to the mud pump by importing electrical power as required to add power to the drivetrain; and, Mode V: shutting the ICE 10 off, reducing run-time of the ICE, which has the additional advantages of increasing the overall lifetime and decreasing the maintenance of the ICE 10, also leaving the unit in the state of readiness as dictated by the application.

It will be apparent to those of skill in the art that by routine modification the present invention can be optimized for use in a wide range of conditions and application. It will also be evident to those of skill in the art that there are various ways and designs with which to produce the apparatus and methods of the present invention. The illustrated embodiments are therefore not intended to limit the scope of the invention, but to provide examples of the device and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be understood in the broadest possible manner consistent with the context. In particular, the words "comprises" and "comprising" should be construed as referring to elements, components, or steps in a non-exclusive manner, indicating that the referenced elements, components, or steps may be present, or utilized, or combined with other features, components, or actions that are not expressly referenced.

We claim:

1. A mud pump drive system for use on a drilling rig or a frac rig comprising:

a. an input power drive shaft adapted for being connected to an internal combustion engine for receiving mechanical input power therefrom, said internal combustion engine coupled to an electric generator;

b. an output power drive shaft adapted for being connected to a mud pump or a frac pump on the rig for providing mechanical output power thereto;

c. a mechanical drive train interposed between the input power drive shaft and the output power drive shaft and mechanically connected to a modulating electric motor;

d. a first control node electrically connected between the electric generator of the internal combustion engine and the modulating electric motor, the first control node being configured to control transfer of electrical power from the electric generator to the modulating electric motor in an operational mode in which the modulating electric motor is energized from the electric generator to operate the pump; and e. a second control node electrically connected between the modulating electric motor and the electric generator, the second control node being configured to control transfer of electrical power from the modulating electric motor to the electric generator coupled to the internal combustion engine, the second control node being configured to control operation of the modulating electric motor in an operational mode in which the modulating electric motor produces mechanical power to assist the internal combustion engine or in an operational mode in which the modulating electric motor produces mechanical power for driving the mud pump when the internal combustion engine is shut off.

2. The mud pump drive system of claim 1, wherein the modulating electric motor or the electric generator is capable of providing sufficient mechanical power for driving the mud pump.

* * * * *